United States Patent [19]

Popeil

[11] 4,031,650

[45] June 28, 1977

[54] RETRACTABLE NET

[75] Inventor: Samuel Joseph Popeil, Chicago, Ill.

[73] Assignee: Popeil Brothers, Inc., Chicago, Ill.

[22] Filed: Jan. 9, 1976

[21] Appl. No.: 647,805

[52] U.S. Cl. .................................................. 43/12
[51] Int. Cl.$^2$ ......................................... A01K 77/00
[58] Field of Search ........................... 43/12; 273/74

[56] References Cited

UNITED STATES PATENTS

| 1,629,105 | 5/1927 | Hoover et al. | 273/74 X |
| 2,115,082 | 4/1938 | Phillips | 43/12 |
| 2,486,233 | 10/1949 | Wallingford | 43/12 |

Primary Examiner—Louis G. Mancene
Assistant Examiner—Daniel J. Leach
Attorney, Agent, or Firm—Dominik, Knechtel, Godula & Demeur

[57] ABSTRACT

A retractable net is disclosed having a handle and a flexible band forming net hoop. A slide moves essentially from one end of the handle to the other, and contains the ends of the flexible band. A spreader assembly at the net end of the handle shapes the band as it is extended and retracted into a substantially bilaterally symmetrical configuration from a maximum opening to a minimum opening. In addition, a lock having a cam action type toggle mechanism is provided interiorly of the spreader. A paddle bag is formed to fit over the net in its small or retracted configuration thereby securing the netting from falling and sagging, and serving as a paddle for the boat in which the fisherman may be using the net in its fishing configuration.

16 Claims, 8 Drawing Figures

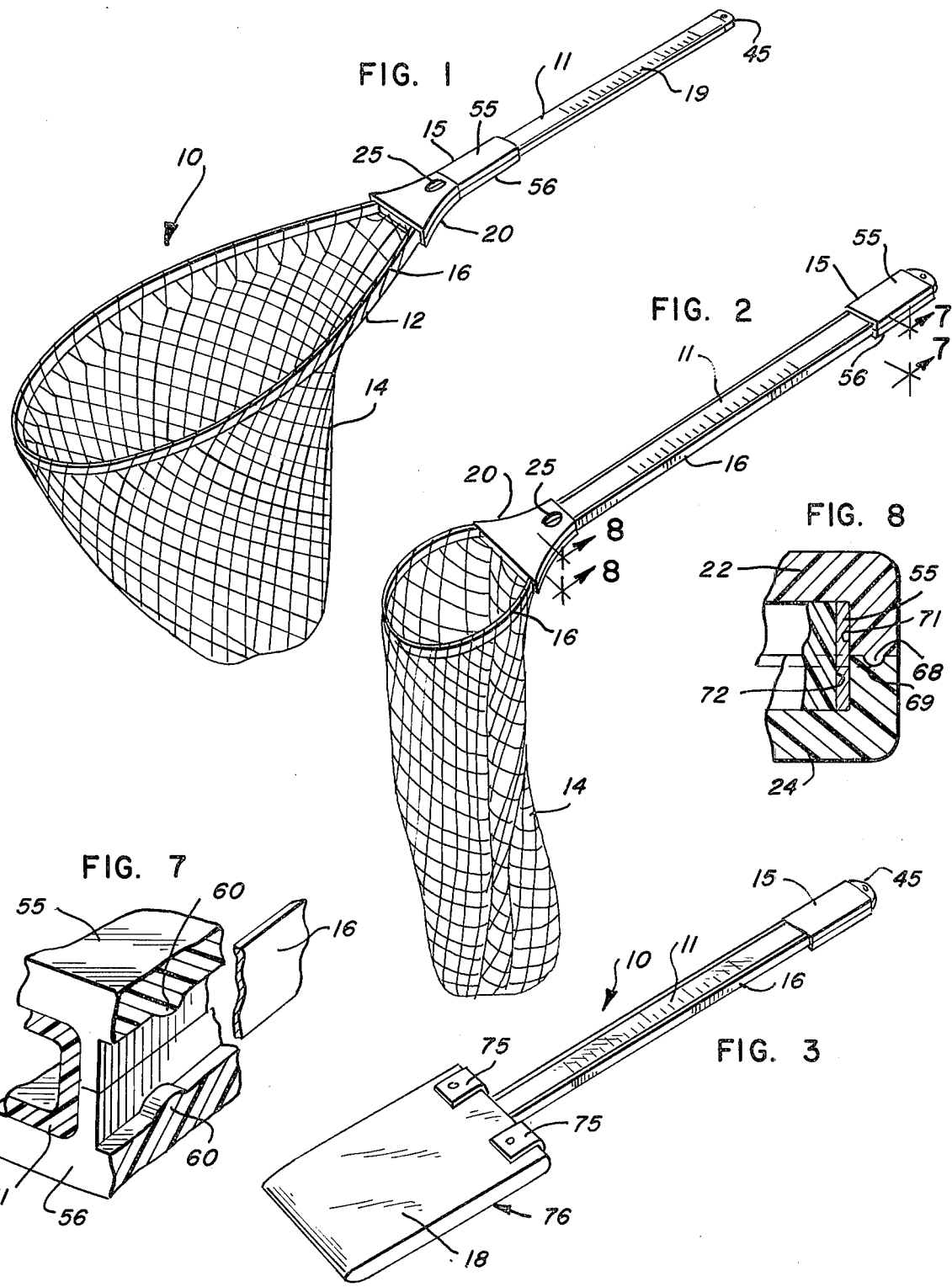

RETRACTABLE NET

FIELD OF INVENTION

The present invention relates to nets, and more particularly the type having a hoop and a web or netting secured around the hoop; and even more specifically that type in which the hoop may be enlarged or contracted. While the principal utility of the subject retractable net is in connection with fishing, and the landing of fish, it would be appreciated that the same could also be used as a butterfly net, net for catching rodents, and other live creatures. In addition, if the net is extended into a tree with an extended handle, the closing of the net will permit the picking of certain fruits as well.

SUMMARY OF THE PRIOR ART

The prior art abounds with fishing nets, butterfly nets, and the like having a handle, a hoop forming member, and a netting or mesh around the hoop forming member.

Attempts have been made at developing a collapsible net for purposes of portability, such as exemplified in U.S. Pat. No 2,814,899.

Such nets, however, do not have the flexibility for closing or opening the hoop whereby the twofold purpose can be achieved of catching or entrapping the contents of the net, and also collapsing the same for purposes of portability and carrying. In addition, even with the collapsible net illustrated in U.S. Pat. No. 2,814,899, its handle member constitutes a protrusion which has little or no value in the retracted configuration, and must be stored in a housing of some sort including the net and webbing in the retractable form to otherwise prevent snarling, snagging, and the like.

SUMMARY

The present invention contemplates a retractable net having a handle and a continuous flexible band forming a net hoop at one end of the handle. One end of the flexible band may be advanced or retracted through a spreader whereby the hoop is increased or decreased in size according to a substantially predetermined pattern. In an embodiment where both ends of the band are advanced and retracted from a substantially opposed configuration, an essentially bilaterally symmetrical hoop is formed. In addition, means may be provided within the spreader to shape the band upon extension or retraction, and by a toggle lock means, secure the band firmly at any preselected position during its extension or retraction. Optionally, a paddle bag is provided to fit over the hoop and net in retracted configuration thereby securing the same against fouling and snagging, and at the same time serving as a water barrier type surface thereby permitting the handle to be utilized along with the paddle bag to the end that the entire combination can serve as an emergency paddle for the user.

In view of the foregoing, it is a principal object of the present invention to provide a retractable net, where the hoop portion of the net can assume a variety of open sizes as the same is retracted or advanced.

A closely related and principal object of the present invention is to provide a retractable net in which the hoop and net portion, upon total retraction, is approximately ⅓ the total size when extended, thereby facilitating storage within a boat when out of use, or elsewhere in the home or fishing camp when the net is not used.

Still another object of the present invention is to provide a retractable net in which a spreader and its interior elements shape the net as well as assist in releasably locking the same.

Still another object of the present invention contemplates a snap fitting handle portion for securing the ends of a flexible band and a retractable net whereby the bands may be removed, and the netting replaced.

A more detailed object of the present invention contemplates a retractable net in which the handle portion is marked with measuring scale, for measuring the length of fish, and in addition where the end cap of the handle may be removed to insert fish rod pieces, gaff rod, or even a stringer and/or related fishing items for further use.

Still another object of the present invention is to provide a paddle bag for the retractable net when it is in its small or retracted configuration whereby the entire length of the handle may be utilized as a paddle handle, with the paddle bag constituting the paddle portion thereof.

DESCRIPTION OF DRAWINGS

Further objects and advantages of the present invention will become apparent as the following description of a preferred embodiment proceeds, taken in conjunction with the accompanying drawings in which:

FIG. 1 is a perspective view of an illustrative retractable net with the hoop portion in the extended or wide open position.

FIG. 2 is a perspective view taken from substantially the same vantage point and at the same scale as FIG. 1, but showing the hoop in its retracted or "substantially closed" configuration.

FIG. 3 is a sequential view taken from the same vantage point and at approximately the same scale as FIG. 2 showing how the paddle bag is secured over the end of the retractable net when the same is in the retracted configuration as FIG. 2, but with the netting and hoop within the paddle bag.

FIG. 7 is an enlarged broken sectional view taken along section line 7—7 of FIG. 2 showing the slidable handle and its means for securing the flexible band.

FIG. 8 is an enlarged broken sectional view taken along section line 8—8 of FIG. 2 illustrating the band and its relationship to the spreader lock and spreader housing wall.

Figures 4, 5, 6:
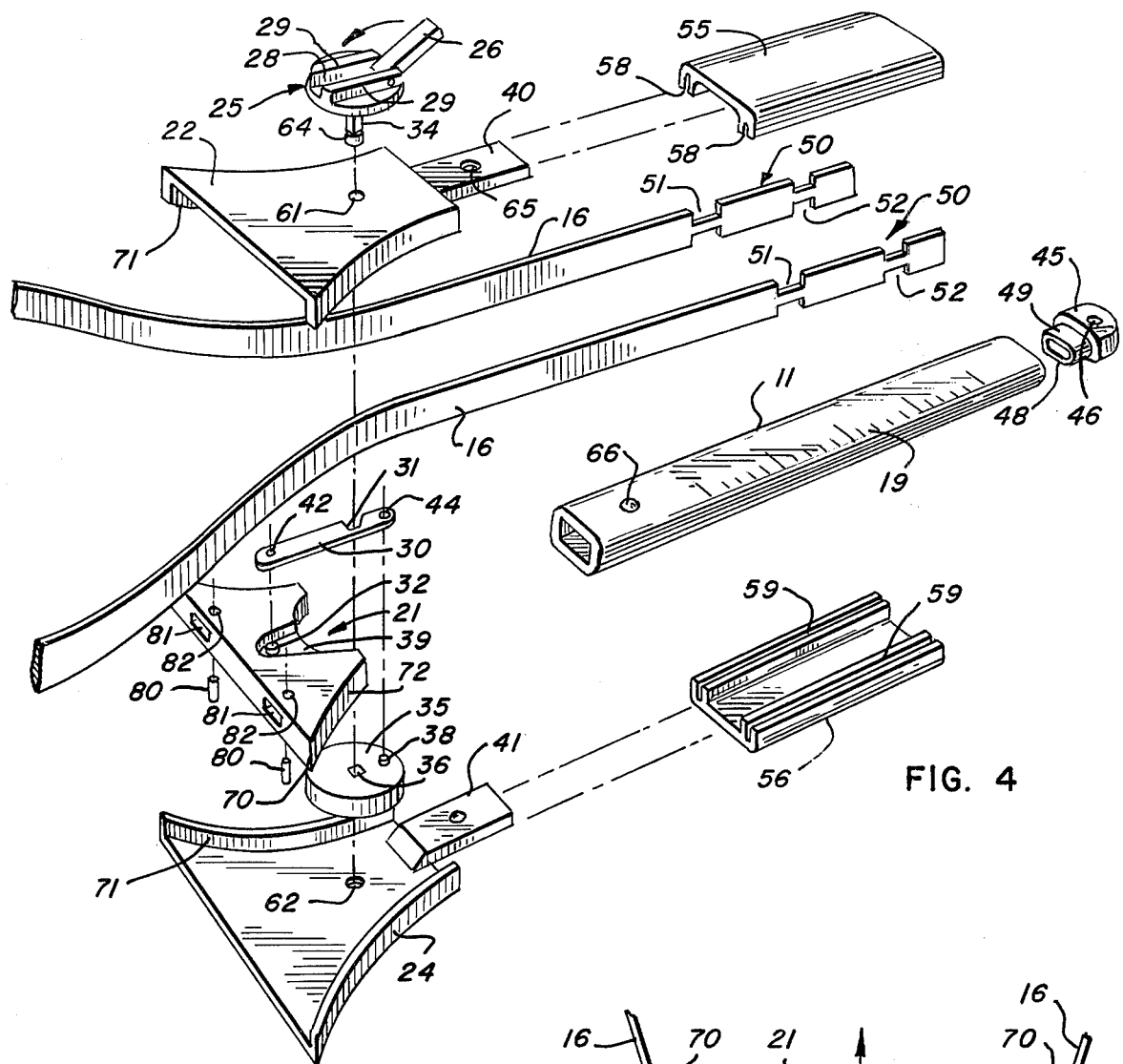
FIG. 4 is an enlarged, broken, exploded, perspective view of the handle and spreader assembly, showing the flexible band in a central portion of the view.
FIG. 5 is a top view, partially in section, of the spreader assembly where the spreader lock is in the locked configuration.
FIG. 6 is a view sequential, in the same scale, and same section as FIG. 5 showing the spreader lock in the extended or "unlocked" configuration.

The subject retractable net 10 is shown in its open configuration in FIG. 1 of the drawings. There it will be seen that one end of the retractable net 10 comprises a handle 11, and the opposite end of the handle 11 defines a hoop 12 from which the closed netting 14 depends. The netting 14 is impaled around the periphery of the hoop 12 generally by weaving the same in and out of the holes of the net as generally practiced in the art.

A handle slide 15 is shown in FIG. 1 substantially adjacent the hoop 12 and netting 14 which, in the extended configuration as shown in FIG. 1, maximizes the opening defined by the hoop band 16.

In the configuration shown in FIG. 2, the handle slide 15 is in the fully retracted position adjacent the end cap 45 of the handle 11. In this configuration the hoop band 16 defines its smallest opening of the netting 14. The ends of the hoop band 16 in the retracted configuration as shown in FIG. 2 are in substantially flanking relationship to the handle 11.

In order to secure the netting 14 from snagging, ripping, tearing, and otherwise render the retractable net 10 compact, a paddle bag 18 is secured over the netting 14 and its related hoop band 16, and then paddle bag snaps 75 are closed over the open end of the paddle bag 18 to define a paddle like member or assembly 76 at the end of the handle 11 remote from the handle slide 15. In this configuration the user can grasp the handle slide 15, the handle 11, and dip the paddle assembly 76 in the water and use the same as an emergency paddle. To further render the retractable net 10 practical, particularly when used by fisherman, a measuring scale 19 is provided on the handle 11 so that the size of various fish caught can be measured to determine the propriety of their retention.

The spreader assembly 20 appears at the junction between the net opening of the hoop 12, and the handle 11. More specifically, the same is shown in exploded form in FIG. 4. There it will be seen that a spreader lock 21 comprises the interior portion of the spreader assembly 20, the latter being defined by an upper housing 22 and a lower housing 24. A lock actuator 25 is rotatably mounted against the spreader assembly 20 by means of the actuator stud 34 extending therebeneath, and terminating in the axle portion 64. In addition, the lock actuator 25 includes a finger tab 26 which is swivelably and retractably mounted between a pair of recess ribs 29 defining a tab recess 28 therebetween. A lock link 30 having a locking notch 31 and opposed pin bores 42, 44 is pivotally secured at one end to the lock link pin 32 of the spreader lock 21. At the opposite end the lock link pin 38 fits within the pin bore 44 and, upon rotation of the lock cam 35, advances or retracts the lock link 30 and its associated spreader lock 21. The actuator stud 34 is preferably square in configuration, but other configurations having flat surfaces for coacting with a stud recess 36 within the lock cam 35 will suffice. The recess 39 within the spreader lock 21 (particularly as shown in FIGS. 5 and 6) permits the lock link 30 to move in and out of coacting relationship between the locking notch 31 and the actuator stud 34 as shown respectively in FIGS. 5 and 6.

Further as illustrated in FIG. 4, the spreader assembly 20 is secured to the handle 11 by means of opposed handle tangs 40, 41 respectively as extensions of the upper housing 22 and lower housing 24 of the spreader assembly 20. The actual securement is accomplished by means of a handle detent 65 in the upper handle tang 40, and staked in place by means of stake 66 in the handle 11 to the handle detent 65.

At the far end of the handle 11 an end cap 45 is provided, the same having a hanging hole 46 at its end, and a mounting stud 48 at the opposite end terminating in a mounting stud collar 49 having an exterior collar configuration conforming to the interior cross section of the handle 11. Optionally the subject end cap may be removed, and fishing paraphernalia such as small rods, gaff hooks, or stringers may be inserted interiorly of the body of the handle 11.

Lock notch assemblies 50 are provided at the ends of the flexible band 16. The assembly 50 comprises opposed inner notches 51 and opposed outer notches 52 at opposed stations on the two ends of the flexible band 16. The ends of the flexible band 16 and more particularly the lock notch assembly 50 are secured interiorly of the handle slide 15 since the latter comprises an upper half 55 and a lower half 56, each having upper band slots 58, lower band slots 59, and a plurality of band lock knobs 60 interiorly of the slots 58, 59 to nestingly engage the opposed notches 51, 52 of the lock notch assemblies on the ends of the flexible band 16 (as shown in FIG. 7).

The upper housing 22 and lower housing 24 of the spreader assembly 20, as shown in FIG. 8, have respectively a tongue 68 and groove 69 on their opposed faces thereby completing the assembly of the spreader assembly 20.

Referring now again to FIG. 4, it will be seen that the spreader lock 21 has hoop forming ends at its outer portion, followed by locking walls 72 which have a configuration substantially the same as the inner shaping walls 71 of the upper housing 22 and lower housing 24 of the spreader assembly 20.

As a consequence of the configuration of the locking wall 72 and the shaping wall 71, the flexible band 16 as shown in FIGS. 5 and 6, is secured between those walls and its flexing holds the locking link 30 and its associated elements in position as shown in FIG. 5. To unlock, the finger tab 26 (see FIG. 4) is lifted, and the lock actuator 25 rotated. As the lock actuator 25 rotates, the actuator stud 34 extending downwardly through the lock cam 35 rotates the latter, thereby urging lock link pin 38 to retract or advance the lock link from the positions shown at opposite extremes in FIGS. 5 and 6. Once the actuator axle 64 of the lock stud 62 is totally rotated, the lock actuator stud 34 is positioned within the lock notch 31. Further to be noted is how the recess 39 accommodates the lateral movement of the lock link 30. While an actuator journal 62 has been shown in the lower housing 24, it will be appreciated that a collar may be sustituted for the actuator axle 64 at the lower portion of the actuator stud 34, and that the actuator stud bore 61 in the upper housing 22 may receive a circular portion of the actuator stud 34, or alternatively the actuator stud 34 may be provided with its own collar.

The opposed portions of the slide 55, 56 may be snapfittingly engaged each to the other, and are removable by means of bolts or threaded members. The purpose of the removable relationship, particularly as shown in FIG. 4, is so that the flexible band 16 may be withdrawn through the spreader assembly 20, and thereafter the net 14 replaced. To this end, it will be noted that the spreader lock 21 is provided with net pins 80 which are removably positioned within net recesses 81 in the ends of the spreader lock 21, by means of net pin holes 82. Safety pins may be substituted for the net pins 80 as shown. In this fashion, the net portion which is closely adjacent the spreader assembly 20, is secured for movement in and out slightly as the lock actuator 25 is activated.

In view of the foregoing, it will be observed that a retractable net 10 has been disclosed and described having a substantially infinite number of net hoop openings between a position where the handle slide 15 is extended close to the hoop 12, and remote from the hoop 12 as shown respectively in FIGS. 1 and 2. In the remote configuration as shown in FIG. 2 which is also acceptable for storage, the net 14 is secured generally interiorly of the hoop band 16, and thereafter a paddle bag 18 is secured thereabout by means of paddle bag snap 75 rendering the thus retracted and stored configured retractable net 10 available as an emergencey paddle.

Exemplary of the dimensional advantages achieved through the retractable hoop, are the dimensions of a commercial embodiment. When the net is extended, the hoop takes a semi-ellipsoidal configuration in which long axis is 21 inches, and the minor axis is 18 inches, rendering, along with a handle, length of 26 inches, a total length of 47 inches to the net in its maximum open configuration. When the band and hoop are retracted, however, the handle length remains 26 inches, but the total length is reduced to 32 inches from 47 inches, and the hoop assumes a substantially circular configuration of only 6 inches by 6 inches, or a reduction in diameter of at least one-third. Nonetheless, the 6 inch by 6 inch circular configuration of the retracted hoop is stronger since the unsupported length is reduced, and therefore, when serving as a paddle can resist normal paddling pressures.

Although particular embodiments of the invention have been shown and described in full here, there is no intention to thereby limit the invention to the details of such embodiments. On the contrary, the invention is to cover all modifications, alternatives, embodiments, usages and equivalents of a retractable net as fall within the spirit and scope of the invention, specification and the appended claims.

What is claimed is:

1. A retractable net comprising, in combination, a handle,
a mesh net at one end of the handle,
a continuous flexible band reversibly flexed thereby forming a net hoop,
said band having ends along the handle,
means at the end of the handle adjacent the net to engage the band and shape the same when passed therethrough,
said net having means for securing the same to the band,
and means for advancing and retracting at least one end of the flexible band,
said means for advancing and retracting at least one end of the flexible band comprising a hollow member proportioned to slide along the handle,
said hollow member comprising separable members,
said band ends being locked in place when said members are secured together,
and means for securing said members together,
whereby a net hoop of increasing and decreasing opening is formed by advancing and retracting the flexible band, and whereby the band may be released to replace the netting by separating the hollow member.

2. In the net of claim 1,
means for locking said band at selected positions as the same is advanced or retracted.

3. In the net of claim 1,
means for advancing and retracting both ends of the band while the same are essentially opposite each other,
whereby the hoop is opened and closed in an essentially bilaterally symmetrical configuration.

4. A retractable net comprising, in combination,
a handle,
a mesh net at one end of the handle,
a continuous flexible band reversibly flexed thereby forming a net hoop,
said band having ends along the handle,
means at the end of the handle adjacent the net to engage the band and shape the same when passed therethrough,
said net having means for securing the same to the band,
and means for advancing and retracting at least one end of the flexible band,
said means for shaping having spreader means having a Y shaped interior wall engaging the band on its interior portion,
means interior of the spreader and band having ends engaging said band and diverting the same outwardly as the band is advanced.

5. In the net of claim 4,
means for advancing and retracting both ends of the band while the same are essentially opposite each other,
whereby the hoop is opened and closed in an essentially bilaterally symmetrical configuration.

6. In the net of claim 4,
said spreader means comprising, an upper housing a lower housing,
means defining outwardly diverging shaping walls in opposed relationship against which the band may fit,
a spreader lock proportioned to fit within the spreader housing,
said spreader lock having locking walls complimentary to the shaping walls of the housing for receiving the band therebetween and terminating in hoop forming ends,
and means for moving the spreader lock in and out of face to face relationship with the band.

7. In the net of claim 6,
said means for moving the spreader lock comprising a link and a crank in toggle relationship,
whereby when the lock is engaged its locking walls oppose the shaping walls of the housing and the flex of the band urges the same in continuing locked relationship.

8. A retractable net and paddle comprising
a handle
a mesh net at one end of the handle having a hoop forming member
a paddle bag proportioned to contain the hoop forming member and net when closed,
means for locking and forming said band at an infinitely variable selectable position as the same is advanced or retracted,
whereby the paddle bag contains the net and serves with the handle, as a paddle, when the net is retracted by said means for locking into the small configuration and retains the net interiorally of the bag to insure against snagging.

9. In the net and paddle of claim 8,
said means for opening and closing comprising a flexible band.

10. In the net of claim 8, means for advancing and retracting said band at at least one end comprising a hollow member slidable on the handle.

11. In the net of claim 10,
said hollow member comprising two separable halves,
said band ends being locked in place when the halves are secured together,
means for securing said halves together,
whereby the band may be removed to replace the netting.

12. In the net of claim 9,
means for advancing and retracting both ends of the band while the same are essentially opposite each other,
whereby the hoop is opened and closed in an essentially bilaterally symmetrical configuration.

13. In the net of claim 8,
spreader means for shaping said band having a "Y" shaped inner wall engaging the band on its inner portion,
means interior of the spreader and band having ends engaging said bands and diverting the same outwardly as the bands are advanced.

14. In the net of claim 13,
said spreader means comprising,
an upper housing,
a lower housing,
means defining outwardly diverging shaping walls in opposed relationship against which the band may fit,
a spreader lock proportional to fit within the spreader housing,
said spreader lock having locking walls complimentary to the shaping walls of the housing for receiving the band therebetween and terminating in hoop forming ends,
and means for moving the spreader lock in and out of face to face relationship with the band.

15. In the net of claim 14,
said means for moving the spreader lock comprising a link and a crank in toggle relationship,
whereby when the lock is engaged its locking walls oppose the shaping walls of the housing and the flex of the band urges the same in continuing locked raltionship.

16. A retractable net comprising, in combination,
a handle,
a mesh net at one end of the handle,
a continuous flexible band reversibly flexed thereby forming a net hoop,
said band having ends along the handle,
means at the end of the handle adjacent the net to engage the band and shape the same when passed therethrough,
said net having means for securing the same to the band,
a means for advancing and retracting at least one end of the flexible band,
and means for lockingly and hoop formingly engaging said band at an infinite number of positions oriented at the intersection between the handle and the base of the net hoop,
whereby a net hoop of increasing and decreasing opening is formed by advancing and retracting the flexible band.

* * * * *